United States Patent
Koba et al.

(10) Patent No.: US 9,310,637 B2
(45) Date of Patent: Apr. 12, 2016

(54) LIQUID CRYSTAL DISPLAY DEVICE

(71) Applicant: Panasonic Corporation, Kadoma-shi, Osaka (JP)

(72) Inventors: Hiroki Koba, Osaka (JP); Motoyuki Okuo, Osaka (JP); Kazuyuki Yoshida, Osaka (JP); Yoshihiro Furuta, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 98 days.

(21) Appl. No.: 14/011,386

(22) Filed: Aug. 27, 2013

(65) Prior Publication Data

US 2014/0063357 A1    Mar. 6, 2014

(30) Foreign Application Priority Data

Aug. 31, 2012 (JP) ................................ 2012-190937
Jul. 4, 2013 (JP) ................................ 2013-140312

(51) Int. Cl.
*G02F 1/1333* (2006.01)
*G02F 1/1335* (2006.01)

(52) U.S. Cl.
CPC ............... *G02F 1/133385* (2013.01); *G02F 2001/133548* (2013.01)

(58) Field of Classification Search
CPC .............. G02F 2001/133548; G02F 1/133528; G02F 5/3058; B32B 17/10339; C03C 17/002
USPC .......................... 349/5, 161, 62; 427/163, 595
See application file for complete search history.

(56) References Cited

U.S. PATENT DOCUMENTS

| | | | | |
|---|---|---|---|---|
| 5,783,338 | A * | 7/1998 | Cho | 430/7 |
| 6,661,475 | B1 * | 12/2003 | Stahl et al. | 349/9 |
| 8,040,456 | B2 * | 10/2011 | Yamazaki et al. | 349/61 |
| 8,259,238 | B2 * | 9/2012 | Kimura | 349/9 |
| 8,866,977 | B2 * | 10/2014 | Sawado | 349/5 |
| 2005/0190310 | A1 * | 9/2005 | Koyama et al. | 349/5 |
| 2006/0044515 | A1 * | 3/2006 | Suzuki | 353/20 |
| 2007/0002191 | A1 * | 1/2007 | Hashizume et al. | 349/5 |
| 2007/0103606 | A1 * | 5/2007 | Hashizume et al. | 349/5 |
| 2007/0242352 | A1 * | 10/2007 | MacMaster | 359/486 |
| 2010/0053538 | A1 * | 3/2010 | Chao et al. | 349/194 |
| 2011/0310328 | A1 * | 12/2011 | Kumai | 349/62 |
| 2012/0050627 | A1 * | 3/2012 | Furuta | 349/8 |
| 2013/0250412 | A1 * | 9/2013 | Aota | 359/485.05 |

FOREIGN PATENT DOCUMENTS

JP    2012-002972    1/2012

* cited by examiner

*Primary Examiner* — Michael Caley
*Assistant Examiner* — Adam Chen
(74) *Attorney, Agent, or Firm* — Hamre, Schumann, Mueller & Larson, P.C.

(57) ABSTRACT

A liquid crystal display 50 includes: a light source 10; a liquid crystal display panel 213; a wire-grid polarization plate 211, 214 located on at least one of a light-incident side and a light-emission side of the liquid crystal display panel 213, and including a base plate 101 and a plurality of wires 100 arranged in stripes on the base plate 1; a projection lens 23; a cooling part 25 which supplies wind to the liquid crystal display panel 213 and the polarization plate 211, 214 to cool them; and a covering wall 102 which covers end faces of the plurality of wires 100 and ends of a plurality of grooves 108 formed between the plurality of wires 100, at a windward side of the polarization plate 211, 214 in a flow direction of the wind supplied from the cooling part 25.

9 Claims, 6 Drawing Sheets

LIQUID CRYSTAL DISPLAY DEVICE

BACKGROUND

1. Field

The present disclosure relates to a projection type liquid crystal display device using a wire grid polarization plate.

2. Description of the Related Art

In recent years, with enhancement of brightness and contrast of a projection type liquid crystal display device, optical lives of a polarization plate as well as a liquid crystal display panel have become an issue. Particularly, since light of a blue wavelength band is strong short-wavelength light, burning might occur in a polarizer film.

As a countermeasure against above problem, an inorganic polarization plate has been developed, as typified by a wire-grid inorganic polarization plate manufactured by MOXTEK Inc.

This polarization plate can be used as a so-called reflection type polarization plate which transmits only polarized light in a specific vibration direction, and reflects polarized light in other vibration directions. Therefore, the polarization plate is hardly deteriorated with time due to light irradiation, and is used in a projection type liquid crystal display device installed in a rear projection TV which requires long life.

Japanese Laid-Open Patent Publication No. 2012-002972 discloses a projector in which wire-grid inorganic polarization plates are arranged on a light incident side and a light emission side of a liquid crystal light valve.

In this projector, the incident-side inorganic polarization plate is used as a reflection type polarization plate. The emission-side inorganic polarization plate is used as an absorption type polarization plate additionally including a light absorption layer.

SUMMARY

The present disclosure provides a liquid crystal display device which is effective for preventing occurrence of defects due to external factors such as the environment of a wire-grid polarization plate.

A liquid crystal display device according to the present disclosure includes: a light source; a liquid crystal display panel which modulates light emitted from the light source, based on a video signal; a wire-grid polarization plate located on at least one of a light-incident side and a light-emission side of the liquid crystal display panel, the wire-grid polarization plate including a base plate and a plurality of wires arranged in stripes on the base plate; a projection lens which projects the light modulated by the liquid crystal display panel; a cooling part which supplies wind to the liquid crystal display panel and the polarization plate to cool them; and a covering wall which covers end faces of the plurality of wires and ends of a plurality of grooves formed between the plurality of wires, at a windward side of the polarization plate in a flow direction of the wind supplied from the cooling part.

The liquid crystal display device according to the present disclosure is effective for preventing occurrence of defects due to external factors such as the environment of a wire-grid polarization plate.

BRIEF DESCRIPTION OF THE DRAWINGS

(a) of FIG. 2 is a diagram showing a configuration of a liquid crystal display unit, and (b) of FIG. 2 is a diagram showing how the polarization state varies when light passes through a liquid crystal display panel, a first emission-side polarization plate having a high polarization degree, and a second emission-side polarization plate having a low polarization degree.

DETAILED DESCRIPTION

Hereinafter, embodiments of the present disclosure will be described with reference to the drawings according to need. However, there will be instances in which detailed description beyond what is necessary is omitted. For example, detailed description of subject matter that is previously well-known, as well as redundant description of components that are substantially the same will in some cases be omitted. This is to prevent the following description from being unnecessarily lengthy, in order to facilitate understanding by a person of ordinary skill in the art.

The inventors provide the following description and the accompanying drawings in order to allow a person of ordinary skill in the art to sufficiently understand the present disclosure, and the description and the drawings are not intended to restrict the subject matter of the scope of the patent claims.

(Embodiment 1)

Figure 1:
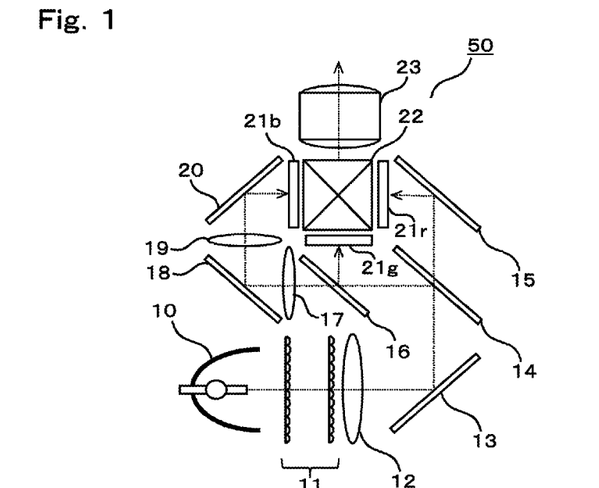
FIG. 1 is a plan view showing an optical system of a three-chip liquid crystal projector according to Embodiment 1.

Hereinafter, Embodiment 1 will be described as an embodiment in which the present disclosure is applied to a liquid crystal projector, with reference to the drawings. FIG. 1 is a plan view showing an optical system of a three-chip liquid crystal projector 50 (hereinafter, referred to as "liquid crystal projector") according to the present embodiment. The liquid crystal projector 50 is an example of a liquid crystal display device according to the present disclosure.

[1. Overall Configuration and Operation of Liquid Crystal Projector]

As shown in FIG. 1, the liquid crystal projector 50 includes a projection light source 10, an integrator lens 11, a collective lens 12, a plurality of total reflection mirrors 13, 15, 18, and 20, a plurality of dichroic mirrors 14 and 16, a plurality of relay lenses 17 and 19, three liquid crystal display units 21r, 21g, and 21b corresponding to three colors R, G, and B, respectively, a dichroic prism 22, and a projection lens 23.

The operation of the liquid crystal projector 50, the configuration of each component, and the like will be described. White light emitted from the light source 10 composed of a metal halide lamp or the like passes through the integrator lens 11 and the collective lens 12, and thereafter, the optical path of the light is turned 90 degrees by the total reflection mirror 13, and thereby the light is guided to the first dichroic mirror 14.

The integrator lens 11 is composed of a pair of lens units. The integrator lens 11 is designed such that lights emitted from individual lens elements included in the rear-side lens unit irradiate an entire surface of a liquid crystal display panel described later. The integrator lens 11 reduces unevenness of brightness of the light emitted from the light source 10, and reduces a difference in light quantity between a center portion and a peripheral portion of a projection screen.

The first dichroic mirror 14 transmits light of a red wavelength band, and reflects light of a cyan (green+blue) wavelength band. The light of the red wavelength band that has passed through the first dichroic mirror 14 is reflected by the total reflection mirror 15 so that its optical path is changed, and thereby guided to the first liquid crystal display unit 21r for red light. The first liquid crystal display unit 21r includes a transmissive liquid crystal display panel for red light, a polarization plate, and the like, and modulates the light guided thereto, based on a video signal.

On the other hand, the light of the cyan wavelength band that has been reflected by the first dichroic mirror 14 is guided to the second dichroic mirror 16. The second dichroic mirror 16 transmits light of a blue wavelength band, and reflects light of a green wavelength band. The light of the green wavelength band that has been reflected by the second dichroic mirror 16 is guided to the second liquid crystal display unit 21g for green light. The second liquid crystal display unit 21g includes a transmissive liquid crystal display panel for green light, a polarization plate, and the like, and modulates the light guided thereto, based on a video signal.

The light of the blue wavelength band that has passed through the second dichroic mirror 16 is guided to the third liquid crystal display unit 21b for blue light, through the relay lens 17, the total reflection mirror 18, the relay lens 19, and the total reflection mirror 20. The third liquid crystal display unit 21b includes a transmissive liquid crystal display panel for blue light, a polarization plate, and the like, and modulates the light guided thereto, based on a video signal.

The modulated lights obtained via the respective liquid crystal display units 21r, 21g, and 21b (video lights of the respective colors) are synthesized by the dichroic prism 22 to be color video light. The color video light is enlarged and projected by the projection lens 23, and displayed on a screen (not shown).

[2. Configuration of Liquid Crystal Display Unit]

Figure 2:
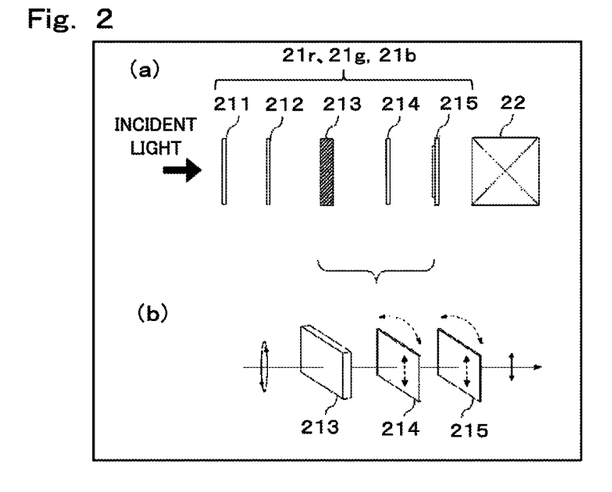

FIG. 2(a) is a diagram showing the configuration of each liquid crystal display unit 21r, 21g, 21b, and FIG. 2(b) is a diagram showing how the polarization state varies when light is transmitted through the liquid crystal display panel 213, the first emission-side polarization plate 214 having the high polarization degree, and the second emission-side polarization plate 215 having the low polarization degree. In FIG. 2(b), solid arrows represent the polarization directions of the light, and dashed arrows represent the light transmission axis directions of the polarization plates 214 and 215.

As shown in FIG. 2(a), each liquid crystal display unit 21r, 21g, 21b includes an incident-side polarization plate 211, an optical compensating plate 212, the liquid crystal display panel 213 formed by enclosing a liquid crystal between a pair of glass base plates, the first emission-side polarization plate 214, and the second emission-side polarization plate 215. In the liquid crystal display panel 213, pixel electrodes, alignment films, and the like are formed between the pair of glass base plates. The incident-side polarization plate 211 is a reflection type polarization plate, and the first emission-side polarization plate 214 and the second emission-side polarization plate 215 are absorption type polarization plates. The polarization degree of the first emission-side polarization plate 214 is higher than that of the second emission-side polarization plate 215. The light transmission axis directions of the incident-side polarization plate 211, the first emission-side polarization plate 214, and the second emission-side polarization plate 215 are parallel to each other. In FIG. 2(b), the light transmission axis of each polarization plate 214, 215 extends in the vertical direction.

Of the unpolarized incident light that enters vertically to the incident-side polarization plate 211, the incident-side polarization plate 211 transmits linearly polarized light (necessary polarized light) whose vibration direction coincides with the light transmission axis direction of the incident-side polarization plate 211, and reflects most of linearly polarized light (unnecessary polarized light) whose vibration direction is perpendicular to the light transmission axis direction. The incident-side polarization plate 211 is composed of a wire-grid inorganic polarization plate (hereinafter sometimes referred to as "inorganic polarization plate 211") mainly for the purpose of long life.

Likewise, the first emission-side polarization plate 214 is also composed of a wire-grid inorganic polarization plate (hereinafter sometimes referred to as "inorganic polarization plate 214") mainly for the purpose of long life. However, the first emission-side polarization plate 214 is an absorption type polarization plate obtained by adding an absorption layer to a polarization plate similar to the incident-side polarization plate 211. Since the first emission-side polarization plate 214 is an absorption type polarization plate, unnecessary reflected light is absorbed by the first emission-side polarization plate 214, and thereby it is possible to resolve deterioration of image quality due to multiple reflections of the unnecessary light between a black matrix incorporated in the liquid crystal display panel 213 and the first emission-side polarization plate 214. The black matrix is formed of a thin metal film, for example.

In addition, the optical compensating plate 212 compensates birefringence of the liquid crystal, and is used for the purposes of enhancing the contrast and resolving unevenness of black display. Further, the second emission-side polarization plate 215 is an organic polarization plate (e.g., dye polarization plate), for example. However, the second emission-side polarization plate 215 is not limited thereto.

The light transmission axis of the first emission-side polarization plate 214 and the light transmission axis of the second emission-side polarization plate 215 are set so as to correspond to each other and be parallel to each other. If these light transmission axes are set so as to deviate from each other, sufficient display performance cannot be achieved. Therefore, the polarization plates 214 and 215 may be rotationally adjusted in the direction shown by dashed-dotted arrows in FIG. 2(b) by using a rotation adjustment mechanism (not shown) so that the light transmission axes thereof completely coincide with each other.

The first emission-side polarization plate 214 alone cannot be expected to have a sufficiently high polarization degree. However, the polarization degree of the linearly polarized light that has passed through the first emission-side polarization plate 214 is increased when it passes through the second emission-side polarization plate 215. Therefore, sufficient contrast can be achieved in a projected video. The contrast depends on the product of the polarization degrees of the two polarization plates 214 and 215.

Further, most of the linearly polarized light in the vibration direction perpendicular to the light transmission axis of the second emission-side polarization plate 215 is previously absorbed by the first emission-side polarization plate 214 before reaching the second emission-side polarization plate 215. Therefore, the second emission-side polarization plate 215 absorbs only a slight amount of light. Accordingly, even if the amount of the incident light on the second emission-side polarization plate 215 increases, most part of the light passes through the second emission-side polarization plate 215. Only slight light absorption occurs at the second emission-side polarization plate 215. Therefore, temperature rise of the second emission-side polarization plate 215 is suppressed as compared to the case where only the organic polarization plates are provided as emission-side polarization plates. It is noted that the temperature of the first emission-side polarization plate 214 that previously absorbs most of the linearly polarized light in the vibration direction perpendicular to the light transmission axis increases to some degree. However, the first emission-side polarization plate 214 is an inorganic polarization plate having greater heat resistance than the organic polarization plate, whereas the organic polarization plate needs to be used at a temperature not higher than 80° C., and therefore, no problem arises even if the temperature of the first emission-side polarization plate 214 rises to about 200° C. It is noted that, in each liquid crystal display unit 21r, 21g, 21b, the liquid crystal display panel 213 has the lowest heat resistance, and the second emission-side polarization plate 215 as an organic polarization plate has the second lowest heat resistance.

[3. Cooling Part]

Figure 3:
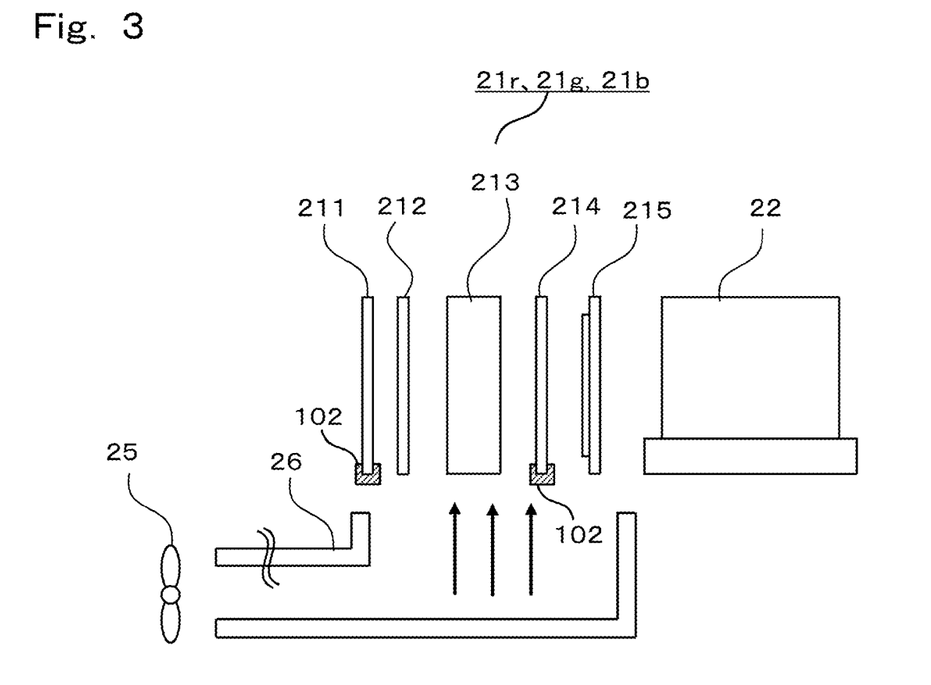
FIG. 3 is a schematic configuration diagram showing the liquid crystal display unit and the like viewed laterally.

FIG. 3 is a schematic configuration diagram showing the liquid crystal display unit and the like viewed laterally. The liquid crystal projector 50 further includes a cooling part 25 for cooling the three liquid crystal display units 21r, 21g, and 21b, and a duct 26 through which air blown out of the cooling part 25 passes. The cooling part 25 sucks outside air via a filter (not shown), and discharges the air toward an inlet port of the duct 26. As shown in FIG. 3, outlet ports of the duct 26 are located beneath each liquid crystal display unit 21r, 21g, 21b. The cooling part 25 supplies cooling wind for cooling each liquid crystal display unit 21r, 21g, 21b to each liquid crystal display unit 21r, 21g, 21b. The liquid crystal display panel 213 is cooled by the cooling wind from the cooling part 25 (fan). In each liquid crystal display unit 21r, 21g, 21b, small gaps exist between the respective components 211, 212, 213, 214, and 215. The cooling wind flows through each gap, from the bottom toward the top of the liquid crystal display panel 213 (in FIG. 2(a), from the far side to the near side).

With the flow of the cooling wind, the cooling wind is also supplied to the incident-side polarization plate 211 and the first emission-side polarization plate 214 which are wire-grid inorganic polarization plates, from their bottoms.

[4. Inorganic Polarization Plate]

Figure 4:
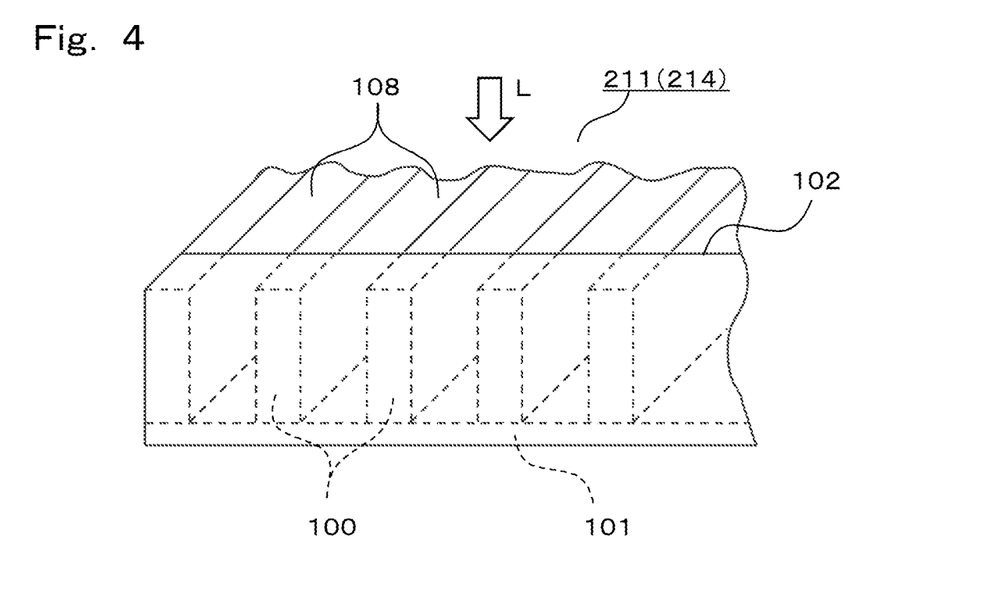
FIG. 4 is a perspective view showing a state where a side end surface of a wire-grid inorganic polarization plate is covered with a UV adhesive agent.

FIG. 4 is a perspective diagram showing a state where a side end surface of the inorganic polarization plate 211, 214 is covered with a UV adhesive agent. Each inorganic polarization plate 211, 214 includes a base plate 101, and a plurality of metal layers 100 arranged in stripes on the base plate 101. Each metal layer 100 is an example of a wire. Each metal layer 100 is fixed to the base plate 101. On the base plate 101, a plurality of grooves 108 are formed between the plurality of metal layers 100. The incident-side polarization plate 211 and the first emission-side polarization plate 214 are each installed such that a surface of the base plate 101 on which the metal layers 100 are provided faces the liquid crystal display panel 213.

Among the three liquid crystal display units 21r, 21g, and 21b, in a part of the liquid crystal display units, the light transmission axis of each inorganic polarization plate 211, 214 extends in the vertical direction, while in the rest of the liquid crystal display units, the light transmission axis of each inorganic polarization plate 211, 214 extends in the horizontal direction. In each inorganic polarization plate 211, 214 whose light transmission axis extends in the vertical direction, each metal layer 100 and each groove 108 extend in the vertical direction, and a lower end face of each metal layer 100 faces the outlet port of the duct 26. In each inorganic polarization plate 211, 214, the lower end face of each metal layer 100 is located at the windward side in the flow direction of the cooling wind blown out of the duct 26. Further, among the four side end surfaces (outer peripheral surfaces) of each inorganic polarization plate 211, 214, one side end surface (lower side end surface) is located at the windward side. In each inorganic polarization plate 211, 214, as a covering wall that covers the lower side end surface, a UV adhesive agent 102 (ultraviolet curable adhesive agent) is provided. At the windward side, the UV adhesive agent 102 covers the ends of the plurality of grooves 108 as well as the end faces of the plurality of metal layers 100.

Figure 5:
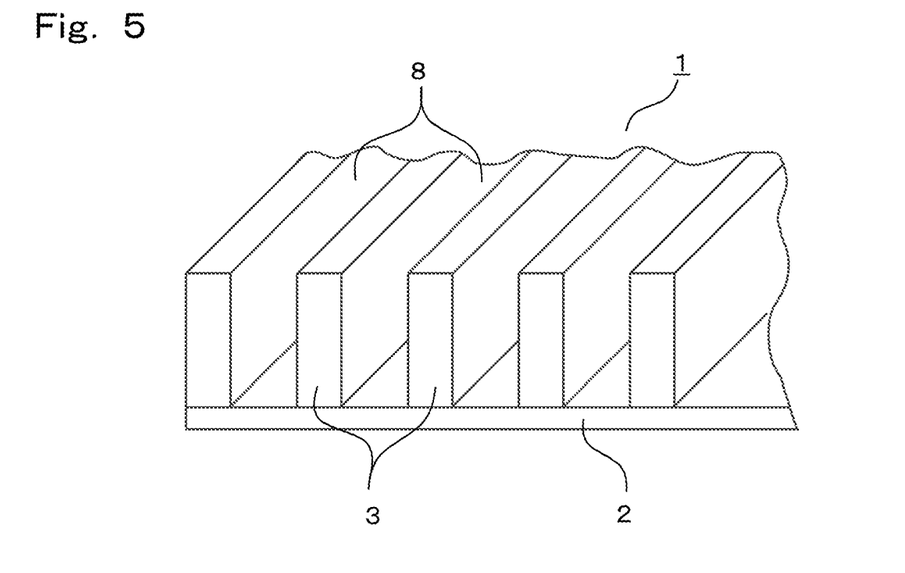
FIG. 5 is a perspective view of a wire-grid inorganic polarization plate whose side end surface is not covered with a UV adhesive agent.
Figure 6:
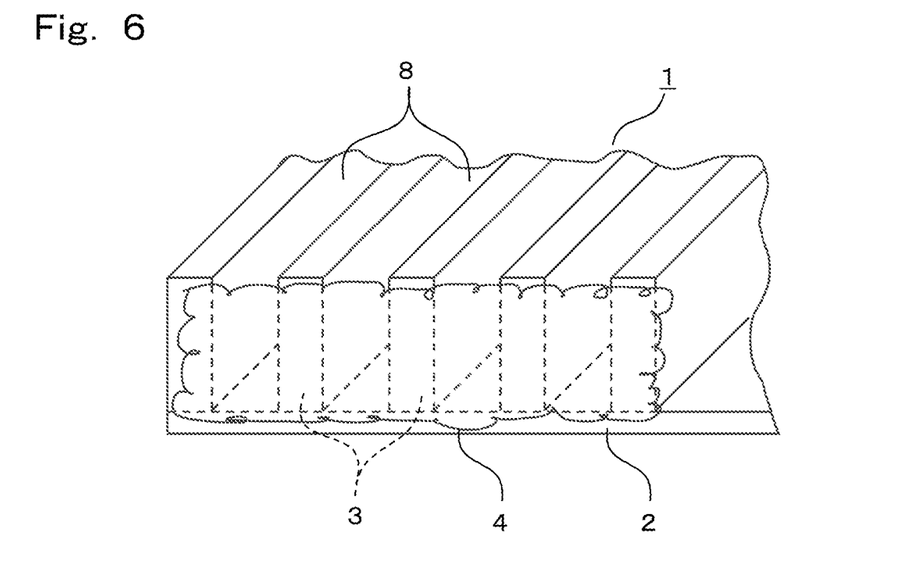
FIG. 6 is a perspective view showing a state where dust attaches to the side end surface of the wire-grid inorganic polarization plate shown in FIG. 5.
Figure 7:
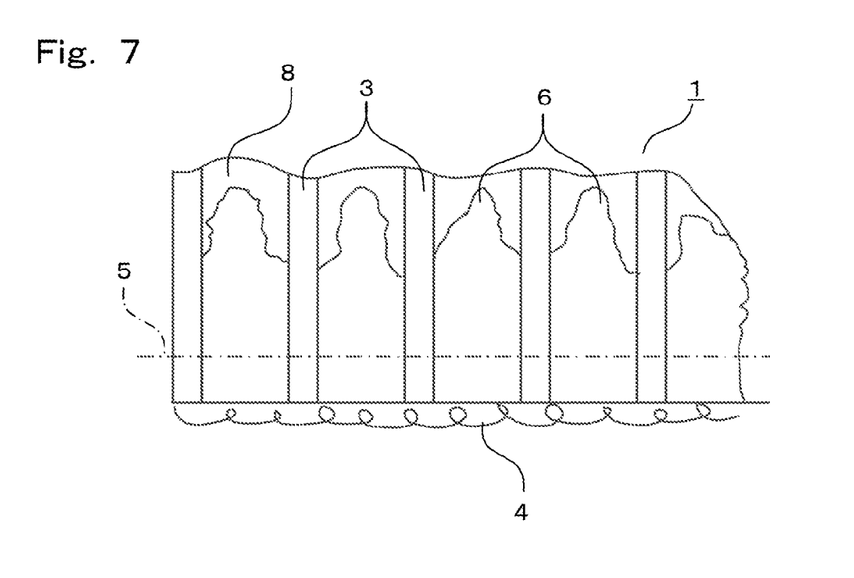
FIG. 7 is a front view showing a state where a foreign substance attaches to an effective region of the wire-grid inorganic polarization plate shown in FIG. 5.

A case where the UV adhesive agent 102 is not provided will be described. FIG. 5 is a perspective view of a wire-grid inorganic polarization plate 1 whose side end surface is not covered with the UV adhesive agent 102. FIG. 6 is a perspective diagram showing a state where dust 4 attaches to the side end surface of the inorganic polarization plate 1 shown in FIG. 5. FIG. 7 is a front view showing a state where a foreign substance 6 attaches to an effective region 5 of the wire-grid inorganic polarization plate 1 shown in FIG. 5.

In the case of the inorganic polarization plate 1, the cooling wind directly hits the lower side end surface located at the windward side. Each of metal layers 3 of the inorganic polarization plate 1 blocks the cooling wind, and thereby the dust 4 is collected over the side end surface at the windward side, as shown in FIG. 6. If the liquid crystal projector (liquid crystal display device) is used in an environment where air contains pollutants, the collected dust absorbs the pollutants as well as atmospheric moisture. Then, the moisture in the collected dust reaches an effective region 5 of the inorganic polarization plate 1 through each groove 8 between adjacent metal layers 3, due to capillary phenomenon. At this time, the pollutants also reach the effective region 5 together with the moisture.

The moisture that has reached the effective region 5 is vaporized by the heat of the light projected from the light source, but the pollutants (foreign substance) 6 contained in the moisture that has reached the effective region 5 remain on the base plate 1 in the effective region 5 as shown in FIG. 7. As a result, the optical characteristics of the polarization plate are deteriorated by the foreign substance 6. In FIG. 7, the outer periphery of the effective region 5 is represented by a dashed-dotted line.

Figure 10:
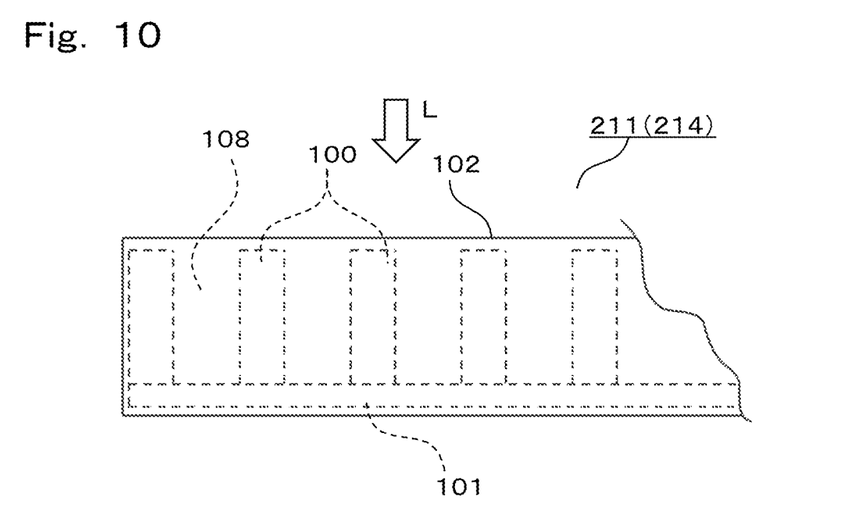
FIG. 10 is a side view showing a state where the side end surface of the wire-grid inorganic polarization plate is covered with the UV adhesive agent.

Therefore, in the present embodiment, as shown in FIGS. 4 and 10, in each of the inorganic polarization plate 211 and the inorganic polarization plate 214, the side end surface at the windward side (the side end surfaces of the metal layers 100 and the like at the windward side) are covered with the UV adhesive agent 102. The side end surface at the windward side is composed of the side end surface of the base plate 101, and the end faces of all the metal layers 100. The UV adhesive agent 102 covers the entirety of the side end surface at the windward side, thereby covering the ends of all the grooves 108 in the direction of the height of the grooves 108. When the side end surface at the windward side are externally viewed from the front, the UV adhesive agent 102 covers the side end surface at the windward side so that none of the grooves 108 are exposed.

The side end surface at the windward side is covered with the UV adhesive agent 102 over a range equal to or larger than the sum of the thickness of the base plate 101 and the height of the metal layers 100 along a direction represented by an arrow L in FIGS. 4 and 10 (the optical axis direction of the light source 10 (the thickness direction of the inorganic polarization plate 211, 214)). The length of the UV adhesive agent 102 (the height of the covering wall) in the thickness direction of the inorganic polarization plate 211, 214 is larger than the thickness of the inorganic polarization plate 211, 214 (i.e., the sum of the thickness of the base plate 101 and the height of the metal layers 100 from the base plate 101). Both end portions (an upper end portion and a lower end portion in FIG. 10) of the UV adhesive agent 102 in the thickness direction of the inorganic polarization plate 211, 214 protrude from the side end surface at the windward side, in the thickness direction of the inorganic polarization plate 211, 214. Further, the width of the UV adhesive agent 102 is larger than a side of the inorganic polarization plate 211, 214 at the windward side.

The covering wall 102 is formed as follows. One of a pair of side end surfaces of the inorganic polarization plate 211, 214, which are opposed to each other in the extending direction of the metal layers 100, is immersed in a UV adhesive agent. After the side end surface is removed from the UV adhesive agent, the UV adhesive agent is cured. In each inorganic polarization plate 211, 214, only one side end surface of the four side end surfaces is coated with the UV adhesive agent 102. Each inorganic polarization plate 211, 214 is incorporated in the liquid crystal projector 50 with the side end surface coated with the UV adhesive agent 102 facing downward. In the present embodiment, since the side end surface of the inorganic polarization plate 211, 214 is coated with the UV adhesive agent 102, the workability of the covering process is improved.

Figure 9:
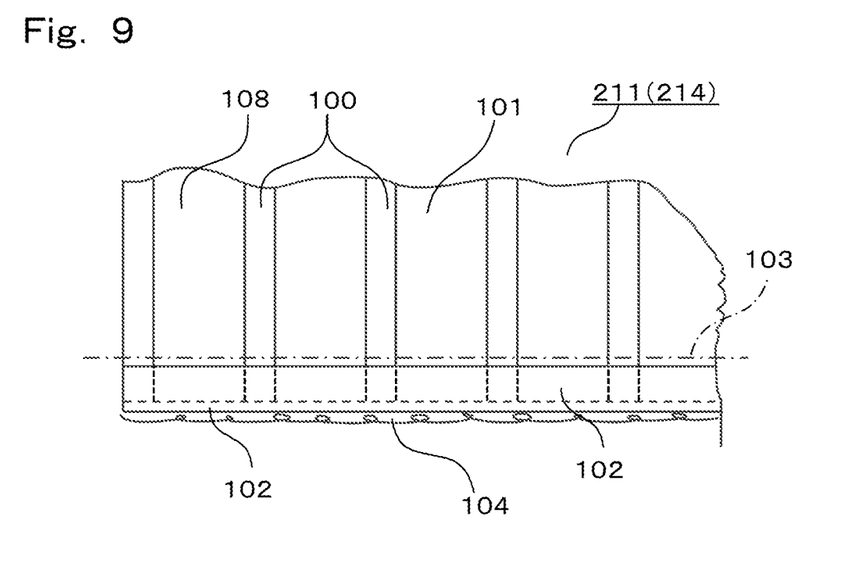
FIG. 9 is a front view showing a state where dust attaches to the external surface of the UV adhesive agent that covers the side end surface of the wire-grid inorganic polarization plate.

Further, the UV adhesive agent moves inwardly in the plurality of grooves 108 due to capillary phenomenon, and then is cured. Therefore, the cured UV adhesive agent 102 also exists in the plurality of grooves 108 as shown in FIG. 9. However, in the plurality of grooves 108, the UV adhesive agent 102 does not exist inside the outer periphery of the effective region 103, but exists only outside the outer periphery of the effective region 103. That is, as shown in FIG. 9, when each inorganic polarization plate 211, 214 is viewed from the front, the inorganic polarization plate 211, 214 outside the effective region 103 is covered with the UV adhesive agent 102. The entirety of the UV adhesive agent 102 is located outside the outer periphery of the effective region 103. It is noted that the effective region 103 is a region that transmits the light to be projected by the projection lens 23.

[5. Effects and the Like]

Figure 8:
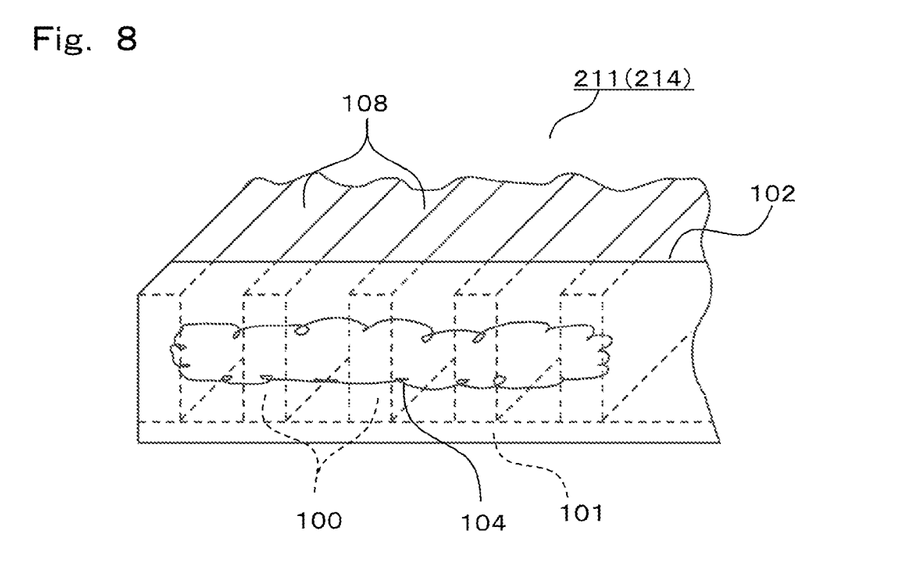
FIG. 8 is a perspective view showing a state where dust attaches to an external surface of the UV adhesive agent that covers the side end surface of the wire-grid inorganic polarization plate.

As described above, the side end surfaces of the inorganic polarization plate 211 and the inorganic polarization plate 214 at the windward side are covered with the UV adhesive agent 102. When the side end surface at the windward side is externally viewed from the front, all the grooves 108 are not exposed. The ends of all the grooves 108 at the windward side are closed by the UV adhesive agent 102. Therefore, at the windward side covered with the UV adhesive agent 102, as shown in FIGS. 8 and 9, dust 104 is collected on the outer surface of the UV adhesive agent 102. The collected dust is isolated from each groove 108 by the UV adhesive agent 102. Therefore, even when the collected dust absorbs moisture, the moisture cannot reach the grooves 108. Accordingly, it is possible to prevent the moisture contained in the collected dust from spreading toward the effective region 103 of the inorganic polarization plate 211, 214 due to capillary phenomenon.

As a result, it is possible to prevent the optical characteristics of the inorganic polarization plate 211, 214 from deteriorating due to the pollutants contained in the dust 4. While in the present embodiment the covering wall 102 does not have water absorbability, the covering wall 102 may be made of a material having low water absorbability.

In the present embodiment, the side end surfaces of the inorganic polarization plate 211 and the inorganic polarization plate 214 at the windward side are covered with the UV adhesive agent 102 serving as a covering wall. Therefore, even when the temperature of the UV adhesive agent 102 rises due to the light emitted from the light source 10 or the like, the UV adhesive agent 102 is maintained in its hard state. It is noted that the covering wall 102 is not limited to the UV adhesive agent. The side end surface of the inorganic polarization plate 211, 214 at the windward side may be covered with, as a covering wall, a thermosetting resin such as epoxy resin. This is similarly applied to Embodiment 2 described later.

To sum up, by covering the side end surface of the inorganic polarization plate 211, 214 at the windward side with a thermosetting member that is not melted at a high temperature, the same effect as that of the present embodiment can be achieved.

While in the present disclosure the optical compensating plate 212 is arranged only on the light-incident side of the liquid crystal display panel 213, the present disclosure is not limited thereto. The optical compensating plate 212 may be separately arranged on the light-incident side of the liquid crystal display panel 213 and the light-emission side thereof. Further, while in the present embodiment the absorption type polarization plate 215 having the low polarization degree is provided in all the liquid crystal display units 21r, 21g, and 21b, the present disclosure is not limited thereto. The absorption type polarization plate 215 may be provided in any one of the liquid crystal display units.

The optical system of the liquid crystal projector 50 is not limited to that shown in FIG. 1. The present disclosure is applicable to liquid crystal projectors having various kinds of optical systems.

The type and mode of the liquid crystal display panel 213 are not particularly limited. The liquid crystal display panel 213 may be of any type such as TN, VA, or IPS, and may be used in any mode such as NW mode or NB mode.

(Embodiment 2)

Figure 11:
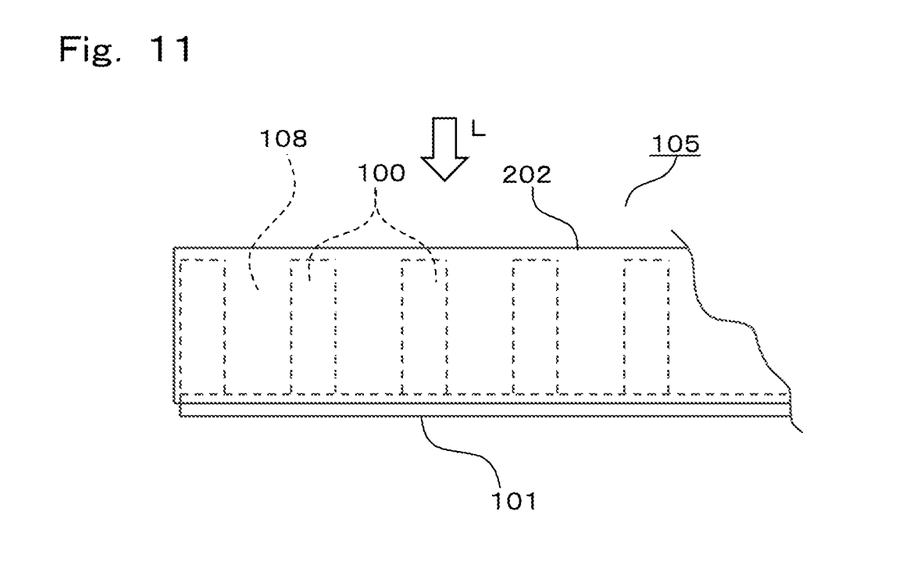
FIG. 11 is a side view showing a state where a side end surface of a wire-grid inorganic polarization plate is covered with the UV adhesive agent, according to Embodiment 2.

FIG. 11 shows a wire-grid inorganic polarization plate 105 according to Embodiment 2. In FIG. 11, the same components as those of Embodiment 1 are denoted by the same reference numerals, and the description thereof is omitted.

In Embodiment 1, the side end surface of the wire-grid inorganic polarization plate 211, 214 at the windward side is covered with the UV adhesive agent 102 over the range wider than the sum of the thickness of the base plate 101 and the height of the metal layers 100. In the present embodiment, however, as shown in FIG. 11, in a wire-grid inorganic polarization plate 105, only the end faces of the metal layers 100 at the windward side and an upper part of the base plate 101 are covered with a UV adhesive agent 202. At the windward side in the flow direction of the wind supplied from the cooling part 25, the UV adhesive agent 202 covers the end faces of all the metal layers 100 and the ends of all the grooves 108

Also in this configuration, since the ends of the grooves 108 at the windward side are closed by the UV adhesive agent 202, even if dust 104 is collected on the external surface of the UV adhesive agent 202 with the flow of the cooling wind, the collected dust is isolated from each groove 108 by the UV adhesive agent 202. Therefore, moisture contained in the collected dust is prevented from spreading due to capillary phenomenon.

As a result, the optical characteristics as the polarization plate 105 are not deteriorated.

(Other Embodiments)

Embodiments 1 and 2 have been described above as illustrative examples of the technology disclosed in the present application. However, the technology according to the present disclosure is not limited thereto and is also applicable to embodiments in which changes, substitutions, additions, omissions, and the like are made as appropriate. In addition, the components described in Embodiments 1 and 2 can be combined to provide a new embodiment.

Hereinafter, other embodiments will be described as illustrative examples.

In Embodiments 1 and 2, at the windward side of the inorganic polarization plate 211, 214, as a covering wall that covers the end faces of the plurality of wires 100 as well as the ends of the plurality of grooves 108, a previously formed plate (e.g., a metal plate) may be used. In this case, the plate is fixed so as to cover the side end surface of the inorganic polarization plate 211, 214 at the windward side. In addition, the plate may be brought into contact with the side end surface at the windward side, or may be brought close to and separated from the side end surface at the windward side. In the latter case, for example, the plate may be attached to the liquid crystal display panel 213 or the like.

Further, while in Embodiments 1 and 2 the covering wall 102 is provided only on the side end surface of the inorganic polarization plate 211, 214 at the windward side, a covering wall that covers the side end surface of the inorganic polarization plate 211, 214 at the leeward side may be provided.

Further, while in Embodiments 1 and 2 the covering wall 102 is provided only on the inorganic polarization plate whose light transmission axis extends in the vertical direction, a covering wall may be provided on the inorganic polarization plate whose light transmission axis extends in the horizontal direction.

As presented above, embodiments have been described as examples of the technology according to the present disclosure. For this purpose, the accompanying drawings and the detailed description are provided.

Therefore, components in the accompanying drawings and the detail description may include not only components essential for solving problems, but also components that are provided to illustrate the above described technology and are not essential for solving problems. Therefore, such inessential components should not be readily construed as being essential based on the fact that such inessential components are shown in the accompanying drawings or mentioned in the detailed description.

Further, the above described embodiment has been described to exemplify the technology according to the present disclosure, and therefore, various modifications, replacements, additions, and omissions may be made within the scope of the claims and the scope of the equivalents thereof.

What is claimed is:

1. A liquid crystal display device, comprising:
   a light source;
   a liquid crystal display panel which modulates light emitted from the light source, based on a video signal;
   a wire-grid polarization plate located on at least one of a light-incident side and a light-emission side of the liquid crystal display panel, the wire-grid polarization plate including a base plate and a plurality of wires arranged in stripes on the base plate;
   a projection lens which projects the light modulated by the liquid crystal display panel;
   a cooling part which supplies wind to the liquid crystal display panel and the wire-grid polarization plate to cool them; and
   a covering wall which is in contact with only end faces of the plurality of wires at a windward side of the wire-grid polarization plate in a flow direction of the wind supplied from the cooling part, and covers only the end faces of the plurality of wires at the windward side of the wire-grid polarization plate in the flow direction of the wind supplied from the cooling part and ends of a plurality of grooves formed between the plurality of wires for preventing moisture from reaching the grooves.

2. The liquid crystal display device according to claim 1, wherein the covering wall is formed of a thermosetting material.

3. The liquid crystal display device according to claim 1, wherein when the wire-grid polarization plate is viewed from its front side, the entirety of the covering wall is located outside an outer periphery of an effective region which transmits the light to be projected by the projection lens.

4. The liquid crystal display device according to claim 3, wherein the covering wall is made of an adhesive agent and covers only the end faces of the plurality of wires so as to cover an outer periphery of the effective regions of the grooves of the base plate.

5. The liquid crystal display device according to claim 1, wherein both end portions of the covering wall in a direction of a thickness of the wire-grid polarization plate protrude from a side end surface of the wire-grid polarization plate at the windward side, in the direction of the thickness of the wire-grid polarization plate.

6. The liquid crystal display device according to claim 1, wherein the covering wall is a plate that covers the side end surface of the wire-grid polarization plate at the windward side.

7. The liquid crystal display device according to claim 1, wherein
   the wire-grid polarization plate comprises an absorption layer, the wire-grid polarization plate being arranged as a first emission-side polarization plate on an emission side of the liquid crystal display panel;
   a second emission-side polarization plate is present, the second emission-side polarization plate being separate from the first emission-side polarization plate and disposed on a side opposite to the liquid crystal display panel across the first emission side polarization plate; and
   the covering wall is in contact with only the end faces of the plurality of wires at the windward side of the first-emission side polarization plate in the flow direction of the wind supplied from the cooling part, and covers only the end faces of the plurality of wires at the windward side of the wire-grid polarization plate in the flow direction of the wind supplied from the cooling part and ends of the plurality of grooves formed between the plurality of wires for preventing moisture from reaching the grooves.

8. The liquid crystal display device according to claim 1, wherein the wire-grid polarization plate is arranged as an incident-side polarization plate on an incident side of the liquid crystal display panel, the liquid crystal display device further comprises an optical compensating plate which is separate from the incident-side polarization plate and is disposed on a side opposite to the liquid crystal display panel across the optical compensating plate, and the covering wall is in contact with the only end faces of the plurality of wires at the windward side of the incident-side polarization plate in the flow direction of the wind supplied from the cooling part, and covers only the end faces of the plurality of wires at the windward side of the wire-grid polarization plate in the flow direction of the wind supplied from the cooling part and ends of the plurality of grooves formed between the plurality of wires for preventing moisture from reaching the grooves.

9. The liquid crystal display device according to claim 1, wherein a portion of the covering wall in contact with only the end faces of the wires is exposed to a path in which the wind supplied from the cooling part flows.

* * * * *